United States Patent
Kinzler

(10) Patent No.: US 7,116,937 B2
(45) Date of Patent: Oct. 3, 2006

(54) ELECTRIC APPLIANCE

(75) Inventor: Hans Kinzler, Regensburg (DE)

(73) Assignee: Siemens Aktiengesellschaft, Munich (DE)

( * ) Notice: Subject to any disclaimer, the term of this patent is extended or adjusted under 35 U.S.C. 154(b) by 300 days.

(21) Appl. No.: 10/206,001

(22) Filed: Jul. 26, 2002

(65) Prior Publication Data

US 2003/0022688 A1    Jan. 30, 2003

(30) Foreign Application Priority Data

Jul. 30, 2001 (DE) ................. 101 37 229

(51) Int. Cl.
H04B 7/00 (2006.01)
(52) U.S. Cl. ............... 455/41.2; 455/344; 455/345
(58) Field of Classification Search ........... 455/41.2, 455/41.3, 344, 345, 347, 66.1, 74
See application file for complete search history.

(56) References Cited

U.S. PATENT DOCUMENTS

| | | | | |
|---|---|---|---|---|
| 3,947,766 A | * | 3/1976 | Kawasaki | 455/74 |
| 4,085,405 A | * | 4/1978 | Barlow | 343/858 |
| 4,184,115 A | * | 1/1980 | Munakata et al. | 455/77 |
| 6,015,970 A | * | 1/2000 | Guzik et al. | 250/229 |
| 6,101,870 A | * | 8/2000 | Kato et al. | 73/146.8 |
| 6,160,997 A | * | 12/2000 | Oberlaender | 455/557 |
| 6,697,638 B1 | * | 2/2004 | Larsson et al. | 455/553.1 |
| 2001/0028717 A1 | * | 10/2001 | Ohmura et al. | 381/86 |

FOREIGN PATENT DOCUMENTS

| | | |
|---|---|---|
| DE | 87 09 924.1 | 2/1988 |
| DE | 197 12 832 C1 | 10/1998 |
| DE | 199 21 533 C1 | 1/2001 |
| EP | 0 867 792 A1 | 3/1998 |
| EP | 0 867 792 B1 | 3/1998 |
| EP | 1 052 634 A2 | 3/2000 |
| EP | 1 052 634 B1 | 3/2000 |

OTHER PUBLICATIONS

Bluetooth im Auto: Moglichkeiten und Grenzen; Von Wolfgang Hascher; Elektronik Automotive.
International Search Report, EP 02 01 4375, 3 pp, May 19, 2005.
Hascher, Wolfgang, Bluetooth im Auto: Möglichkeiten und Grenzen, Elektronik Automotive p. 68-71, 2000.

* cited by examiner

*Primary Examiner*—Matthew Anderson
*Assistant Examiner*—Sanh Phu
(74) *Attorney, Agent, or Firm*—Baker Botts L.L.P.

(57) ABSTRACT

Electric appliance, in particular in the form of an automotive radio, having a control element (4) for manual control of the electric appliance by a user, and a transmission unit (5) for wireless transmission of data from and/or to the electric appliance, the transmission unit (5) being integrated at least partially spatially into the control element (4).

18 Claims, 2 Drawing Sheets

Schnitt A-A

FIG 1 Schnitt B-B
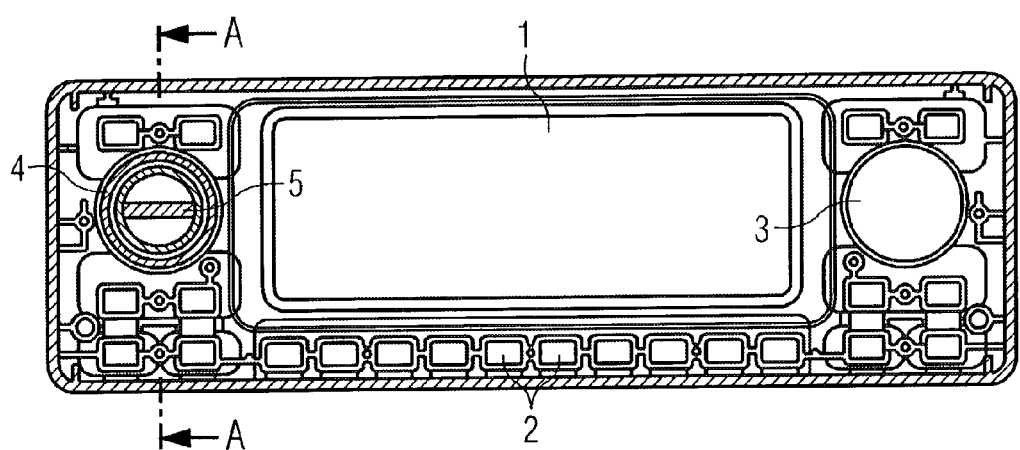
FIG 2
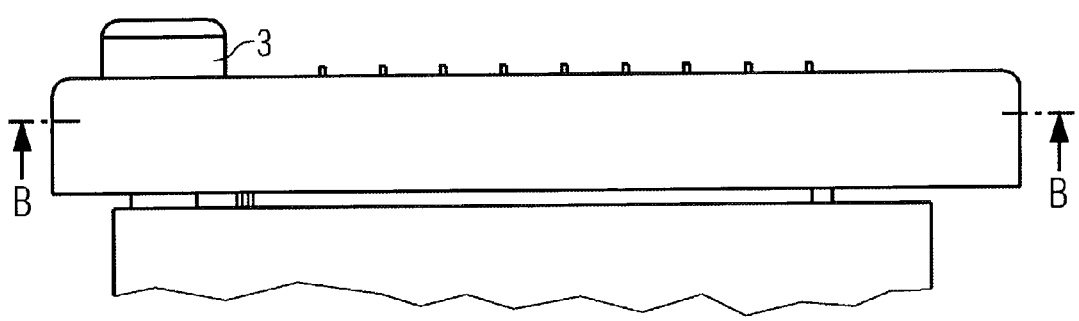

FIG 3 Schnitt A-A
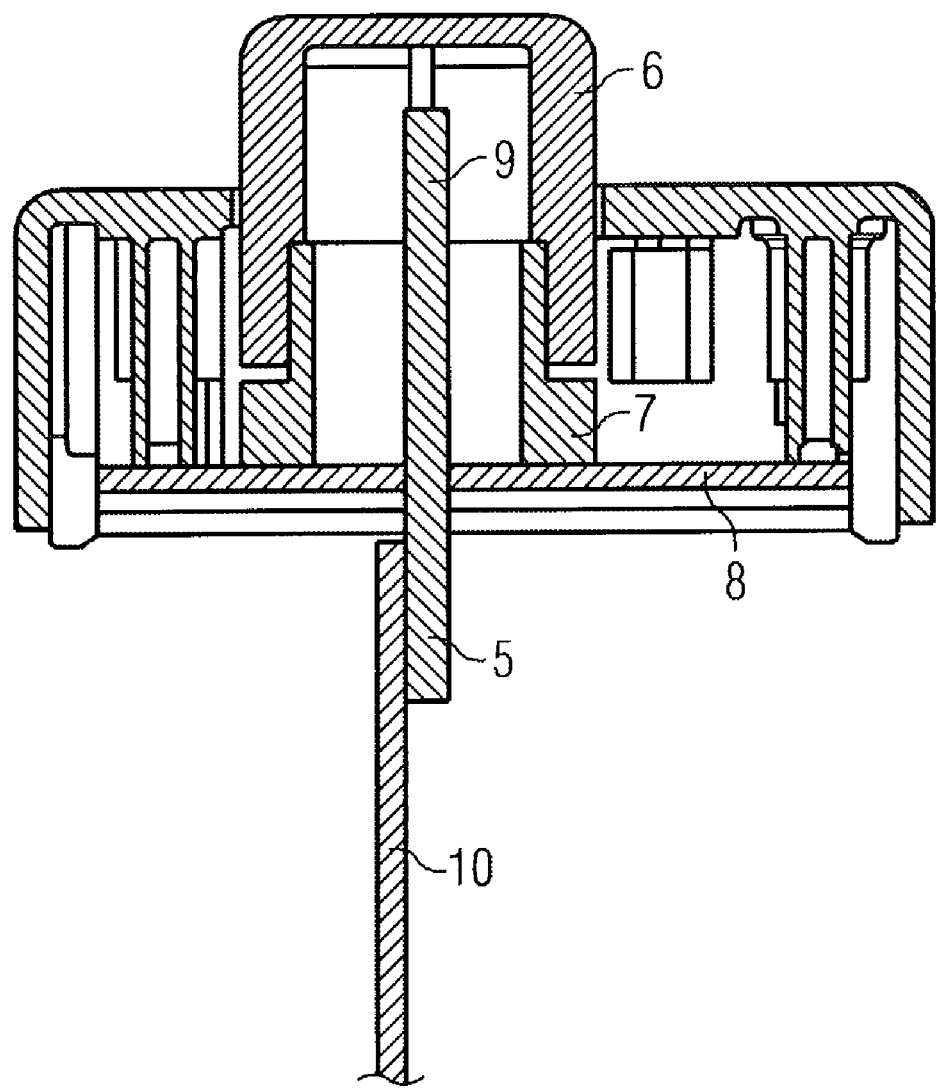

ELECTRIC APPLIANCE

CROSS REFERENCE TO RELATED APPLICATION

This application claims priority to German application number 101 37 229.9 filed Jul. 30, 2001.

BACKGROUND OF THE INVENTION

The invention relates to an electric appliance, in particular in the form of an automotive radio.

Electric appliances such as, for example, mobile radio telephones, transportable computers and so-called organizers, increasingly require wireless transmission of data from and to other appliances. Different manufacturers have developed for such short-range data transmission the so-called Bluetooth standard which permits wireless radio transmission over a distance of up to 10 m in the case of a transmission rate of 1 Mbit/s. So-called Bluetooth modules have already been developed for this purpose: they include on a circuit board having a length of 32 mm and a width of 15 mm a radio antenna and the actual transmission unit in the form of a microchip.

Moreover, Bluetooth receivers have already been installed in automotive radios of motor vehicles, it being impossible, for reasons of space, to arrange the above-described Bluetooth modules directly on the front printed circuit board of the automotive radio. The antennas have therefore been arranged separately from the actual Bluetooth receivers and in the front panel of the automotive radio, while the actual Bluetooth receiver is arranged on the main printed circuit board of the automotive radio and is connected to the antenna by RF plugs or so-called RF pigtails.

However, it is disadvantageous in this known arrangement that an RF-critical connection is required to connect the antenna to the actual Bluetooth receiver. Again, the structural separation of antenna and Bluetooth receiver thereby prevents the use of conventional Bluetooth modules that are integrated on a single circuit board and will be fabricated in future in bulk and therefore cost-effectively.

SUMMARY OF THE INVENTION

It is therefore the object of the invention to create the possibility of integrating conventional Bluetooth modules into an electric appliance.

This object is achieved-by an electric appliance having a control element for manual control of the electric appliance by a user, and a transmission unit for wireless transmission of data from and/or to the electric appliance, wherein the transmission unit is integrated at least partially spatially into the control element.

The invention comprises the general technical teaching of integrating a transmission unit for wireless transmission of data from and/or to the electric appliance at least partially spatially into a control element of the electric appliance, such as a rotary knob, for example.

However, it is not necessary within the scope of the invention for the complete transmission unit or the complete Bluetooth module to be integrated into the control element. Rather, it is sufficient within the scope of the invention when the transmission unit is integrated partially spatially into the control element. This can mean, for example, that only the antenna of the transmission unit is integrated partially spatially into the control element, whereas the actual transmitter or receiver can be arranged at a different location. However, it is also possible for the complete transmission unit with antenna and transmitter and/or receiver to be integrated partially spatially into the control element.

In the case of the control element used for integration of the transmission unit, the preferred embodiment is a rotary transducer with a hollow shaft, the transmission unit being arranged at least partially inside the hollow shaft. Such an arrangement of the transmission unit offers the advantage that the antenna of the transmission unit is placed at a favorable location, and therefore has good transmission characteristics. Moreover, the otherwise unused installation space inside the hollow shaft is utilized in this way.

In this case, it is preferable to provide a front printed circuit board which runs parallel to the front panel in the case of an automotive radio. A cutout is preferably arranged in this case in the region of the axis of rotation of the hollow shaft, the transmission unit extending at least partially through the cutout in the front printed circuit board. Such an arrangement offers the advantage, firstly, that the hollow shaft of the rotary transducer need not hold the entire transmission unit, and so the scope for configuration is not constrained with regard to the axial overall length of the hollow shaft. Again this arrangement offers the advantage that the transmission unit can thereby be connected in a simple way to a main printed circuit board located behind the front printed circuit board without the need for a separate cable bushing through the front printed circuit board.

It has already been set forth above that the transmission unit preferably has an antenna and a transmitter and/or a receiver. In one variant of the invention, the complete transmission unit with antenna and transmitter and/or receiver is integrated at least partially spatially into the control element such that the connection of the transmission unit with the main printed circuit board or another module can be performed by an RF-non-critical low-frequency line. In another variant of the invention, by contrast, only the antenna is at least partially spatially integrated into the control element, whereas the transmitter or the receiver of the transmission unit is arranged at another location, for example on the main printed circuit board. This offers the advantage that the available installation space for the transmitter or the receiver is not restricted by the size of the control element.

In the preferred embodiment, the transmission unit is, however, integrated completely and, preferably, also together with the antenna, on a single circuit board, the circuit board of the transmission unit preferably being arranged substantially parallel to the axis of rotation of the hollow shaft, and preferably centrally in the hollow shaft.

The antenna is thereby preferably located on the side of the circuit board of the transmission unit directed outward, in order to ensure reception which is as good as possible. Moreover, it is preferably provided that the antenna projects axially outward over the hollow shaft in order to avoid shading by the hollow shaft and the worsening of the transmission characteristics associated therewith.

The invention is not limited to data transmission corresponding to the above-described Bluetooth standard. Rather, conventional radio, ultrasonic or infrared transmission is also possible.

BRIEF DESCRIPTION OF THE DRAWINGS

Other advantageous developments of the invention are characterized in the dependent claims, or are explained in more detail below together with the description of the preferred exemplary embodiment of the invention with the aid of the figures, in which:

FIG. 1 shows a front view of an automotive radio according to the invention with an integrated Bluetooth module, FIG. 2 shows an illustration of the top view of the automotive radio illustrated in FIG. 1, and FIG. 3 shows a cross-sectional illustration along the line A—A in FIG. 1.

DETAILED DESCRIPTION OF THE PREFERRED EMBODIMENTS

The automotive or car radio illustrated in FIG. 1 is largely of conventional design and, in addition to a display 1 and a plurality of keys 2, also has two rotary knobs 3, 4, a Bluetooth module 5 being integrated into the rotary knob 4, as will be described in more detail.

In this case, a plastic cap 6 of the rotary knob 4 has been omitted in FIGS. 1 and 2, in order to be able to recognize the arrangement of the Bluetooth module 5 in the rotary knob 4 in the front view in FIG. 1, as well.

The structural design of the rotary knob 4 will now be described below with reference to the cross-sectional illustration in FIG. 3.

Thus, the rotary knob 4 has a rotation angle sensor 7 with a hollow shaft, the rotation angle sensor 7 being mounted on a front printed circuit board 8 such that the axis of rotation of the rotation angle sensor 7 runs substantially at right angles to the front printed circuit board 8. Mounted on the hollow shaft of the rotation angle sensor 7 is the cap 6 which is rotated by the operator. An axially running corrugation is therefore arranged at the contact location between the cap 6 and the hollow shaft of the rotation angle sensor 7, in order to permit force closure between the cap 6 and the hollow shaft.

Furthermore, it may be seen from the cross-sectional illustration in FIG. 3 that the Bluetooth module 5 is arranged centrally in the form of a circuit board inside the hollow shaft of the rotation angle sensor 7, an antenna 9 being arranged in the outwardly directed end of the circuit board. This arrangement of the antenna in the outwardly directed end of the circuit board diminishes the shading and thereby improves the transmission characteristics. Moreover, the Bluetooth module 5 extends outward with the antenna 9 in the axial direction over the end face of the hollow shaft of the rotation angle sensor 7, in order to avoid shading of the antenna by the hollow shaft of the rotation angle sensor. It is, furthermore, to be seen from FIG. 1 that the inside diameter of the hollow shaft of the rotation angle sensor 7 is substantially equal to the width of the Bluetooth module 5, and so the Bluetooth module 5 fits exactly into the hollow shaft. In the case of the exemplary embodiment described here, the Bluetooth module 5 has a length of 32±0.3 mm, a width of 15±0.3 mm and a thickness of up to 2.7 mm, whereas the circuit board of the Bluetooth module 5 has only a thickness of 0.6 mm.

Furthermore, a cutout 9 is arranged in the front printed circuit board 8 in the region of the hollow shaft of the rotation angle sensor 7, the Bluetooth module 5 extending through the cutout 9 in the front printed circuit board 8. On the side of the front printed circuit board 8 averted from the rotation angle sensor 7, the Bluetooth module 5 is connected both electrically and mechanically to a main printed circuit board 10, in order to permit data transmission from and to the other modules of the automotive radio. It is advantageous in this case that the connection of the Bluetooth module 5 to the main printed circuit board 10 can be performed by RF-non-critical lines.

The invention is not restricted to the above-described preferred exemplary embodiment. Rather, it is possible to conceive a multiplicity of variants and modifications which likewise make use of the idea of the invention and therefore fall within the scope of protection.

The invention claimed is:

1. An electric appliance comprising:
a rotary knob for manual control of the electric appliance by a user, and
a transmission unit for wireless transmission of data from the electric appliance and/or for receipt of data from a source other than the electric appliance, wherein the transmission unit comprises an antenna for wireless transmission and reception of signals which is integrated into the rotary knob.

2. An electric appliance as claimed in claim 1, wherein the rotary knob has a hollow shaft, the antenna is arranged at least partially inside the hollow shaft.

3. An electric appliance as claimed in claim 2, wherein a front printed circuit board runs substantially at right angles to the axis of rotation of the hollow shaft, said board having a cutout in the region of the rotary knob, and the antenna extends at least partially through the cutout in said circuit board.

4. An electric appliance as claimed in claim 3, wherein on the side of the front printed circuit board away from the rotary knob, the transmission unit is connected to a main printed circuit board.

5. An electric appliance as claimed in claim 4, wherein the transmission unit has a transmitter and/or a receiver, wherein the transmitter, the receiver, or both are arranged on the main printed circuit board.

6. An electric appliance as claimed in claim 4, wherein a flexible cable connects the transmission unit to the main printed circuit board.

7. An electric appliance as claimed in claim 4, wherein a RF non-critical low-frequency line connects the transmission unit to the main printed circuit board.

8. An electric appliance as claimed in claim 1, wherein the transmission unit is integrated on a circuit board.

9. An electric appliance as claimed in claim 8, wherein the circuit board of the transmission unit is substantially arranged parallel to the axis of rotation of the hollow shaft.

10. An electric appliance as claimed in claim 9, wherein the circuit board of the transmission unit is substantially arranged centrally in the hollow shaft.

11. An electric appliance as claimed in claim 1, wherein the transmission unit has an antenna, said antenna arranged on the side of the transmission unit directed outward.

12. An electric appliance as claimed in claim 11, wherein the antenna projects axially outward over the hollow shaft.

13. An electric appliance as claimed in claim 1, wherein the transmission unit has a radio, ultrasonic or infrared receiver and/or transmitter.

14. An electric appliance as claimed in claim 13, wherein the transmission unit is a Bluetooth module.

15. A car radio comprising:
a rotary knob for manual control of the car radio by a user, and
a transmission unit comprising an antenna for wireless transmission of data from the car radio and/or for the receipt of data from a source other than the car radio, wherein the antenna is integrated into the rotary knob.

16. An electric appliance comprising:

a control element in form of a rotary knob with a hollow shaft for manual control of the electric appliance by a user, and a transmission unit for wireless transmission of data from the electric appliance and/or for receipt of data from a source other than the appliance, said transmission unit at least partially integrated into the hollow shaft wherein a front printed circuit board runs substantially at right angles to the axis of rotation of the hollow shaft, said board having a cutout in the region of the rotary knob, the transmission unit extending at least partially through the cutout in said board, wherein on the side of the front printed circuit board away from a rotary knob, the transmission unit is connected to a main printed circuit board.

17. The electric appliance as claimed in claim 16, wherein the transmission unit has an antenna and a transmitter and/or a receiver, the antenna being integrated at least partially spatially into the control element, whereas the transmitter, the receiver, or both are arranged on the main printed circuit board.

18. The electric appliance as claimed in claim 17, wherein a flexible cable connects the transmission unit to the main printed circuit board.

\* \* \* \* \*